United States Patent [19]

Steiner

[11] Patent Number: 4,862,793
[45] Date of Patent: Sep. 5, 1989

[54] APPARATUS FOR PREPARING SCRAMBLED EGGS

[75] Inventor: Robert A. Steiner, Northbrook, Ill.

[73] Assignee: Prince Castle Incorporated, Carol Stream, Ill.

[21] Appl. No.: 245,513

[22] Filed: Sep. 19, 1988

[51] Int. Cl.⁴ ............................ A23P 1/00; A47J 43/18
[52] U.S. Cl. ........................................ 99/430; 99/348; 99/426; 99/440; 99/427; 99/353; 99/449; 426/614
[58] Field of Search ................. 99/440, 423, 426, 427, 99/430, 449, 348, 353; 426/510, 614

[56] References Cited

U.S. PATENT DOCUMENTS

| | | | |
|---|---|---|---|
| 2,186,335 | 1/1940 | Halpern | 99/430 X |
| 2,824,510 | 2/1958 | Gangwer | 99/440 X |
| 3,943,840 | 3/1976 | Bolte | 99/426 |
| 4,228,193 | 10/1980 | Schindler et al. | 426/510 X |
| 4,488,479 | 12/1984 | Sloan et al. | 99/345 |
| 4,522,117 | 6/1985 | Weimer et al. | 99/348 |
| 4,607,569 | 8/1986 | Murphy | 99/426 |

FOREIGN PATENT DOCUMENTS

| | | | |
|---|---|---|---|
| 39714 | 12/1936 | Netherlands | 99/426 |
| 46301 | 6/1939 | Netherlands | 99/430 |

Primary Examiner—Stephen Marcus
Assistant Examiner—Christine A. Peterson
Attorney, Agent, or Firm—Wood, Dalton, Phillips, Mason & Rowe

[57] ABSTRACT

An apparatus to facilitate producing scrambled eggs on a heated grill surface comprises a frame. At least one egg ring having a lower edge portion is adapted to be disposed in intimate contact with the grill surface for movement therealong and to define with the grill surface an enclosed region within the egg ring for confining liquid eggs. An interceptor member extends across the egg ring in position to engage the liquid eggs therewithin in response to moving the apparatus to and fro over the grill surface. Complementary interengaging portions between the interceptor means and the egg ring properly positions the egg ring on the frame as a function of mounting the interceptor on the frame. Cushion means are provided between the egg ring and the frame to bias the egg ring into intimate contact with the grill surface.

21 Claims, 1 Drawing Sheet

APPARATUS FOR PREPARING SCRAMBLED EGGS

FIELD OF THE INVENTION

This invention generally relates to an apparatus to facilitate preparing scrambled eggs and, particularly, to an improved apparatus which can be operated manually and easily dismantled for cleaning purposes.

BACKGROUND OF THE INVENTION

Conventionally, scrambled eggs are made in batches of relatively small quantities. In restaurants or other high volume institutional operations, scrambled eggs usually are made on flat, hot grill surfaces. Large quantities of an egg mix may be prepared in advance from which smaller portions are used during service. This ensures that orders are filled with scrambled eggs fresh off the grill rather than from batches held for extended periods of time.

An example of a motorized apparatus for preparing multiple serving-sized portions of scrambled eggs on a grill surface is shown in U.S. Pat. No. 4,522,117 to Weimer et al, dated June 11, 19085. That patent shows an apparatus which includes a grill having a grill surface and means for heating the grill surface. The grill is mounted on a frame. The frame mounts a carriage which supports a plurality of egg rings. Each egg ring has a lower edge portion adapted to be disposed in intimate contact with the grill surface and for movement thereover, thereby to define with the grill surface an enclosed region within the egg ring. Motor means on the frame is operatively connected to the carriage for rapidly moving the carriage and the associated egg rings to and fro along the grill surface. Therefore, egg mix placed in the egg rings is confined in the egg rings and is cooked as it moves to and fro on the grill surface. A comb-like interceptor member extends across each egg ring. The lower edge of the interceptor member is adjacent to and above the grill surface and at an elevation to intercept egg mix as the egg ring moves to and fro.

Such an apparatus provides for rapid and consistent preparation of individual, serving-sized portions of scrambled eggs which are moist, fluffy and delectable, and which are substantially indistinguishable from conventionally grill-prepared scrambled eggs. The apparatus provides for the speed necessary for high volume restaurant operations, yet this is done without jeopardizing quality, and the scrambled eggs are consistent from batch to batch, all in a very compact space.

The present invention is directed to an apparatus for preparing scrambled eggs, of the general nature of the apparatus described in relation to the aforesaid patent, but such an apparatus which is easily operated manually and easily disassembled for cleaning purposes. In fact, the frame, the egg rings and the interceptor members are the only components used to assemble the entire apparatus. No extraneous bolts, nuts, latches, linkages or the like are necessary to disassemble the apparatus for cleaning purposes and to reassemble the apparatus for use.

SUMMARY OF THE INVENTION

An object, therefore, of the invention is to provide a new and improved apparatus to facilitate producing scrambled eggs on a heated grill surface.

Generally, the apparatus includes a frame, and at least one egg ring having a lower edge portion adapted to be disposed in intimate contact with the grill surface for movement thereover and to define with the grill surface an enclosed region within the egg ring to confine liquid eggs. Interceptor means extend across the egg ring in position to engage the liquid eggs therewithin in response to moving the apparatus to and fro over the grill surface. Means are provided for readily removably mounting the interceptor means on the frame. Complementary interengaging means are provided between the interceptor means and the egg ring for properly positioning the egg ring on the frame as a function of mounting the interceptor means on the frame. Cushion means are provided between the egg ring and the frame to assure uniform pressure on the ring for sealing against the grill surface. No other extraneous parts or components are necessary to completely assemble and disassemble these basic components.

As disclosed herein, the apparatus is shown to include two pairs of egg rings oriented in a rectangular (or square) array of four rings. A single interceptor member extends across each one of the two pairs of egg rings. Each interceptor member carries its respective pair of egg rings. Each interceptor member is snapped into position onto the frame which, in turn, properly positions the egg rings on the frame for immediate use. No other screws, bolts or similar components are necessary to maintain these basic components in position for functional use. A handle is provided on the frame for manually reciprocating the apparatus to and fro over the grill surface.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
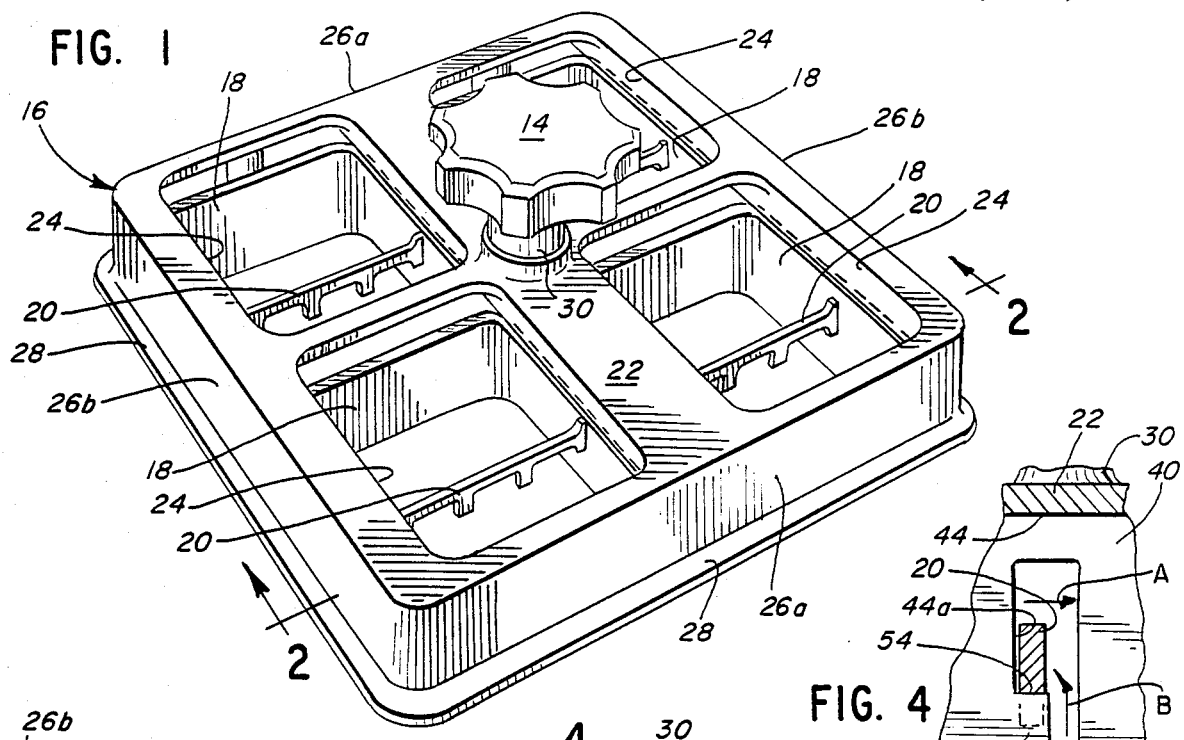
FIG. 1 is a top perspective view of the apparatus of the invention.
Figure 2:
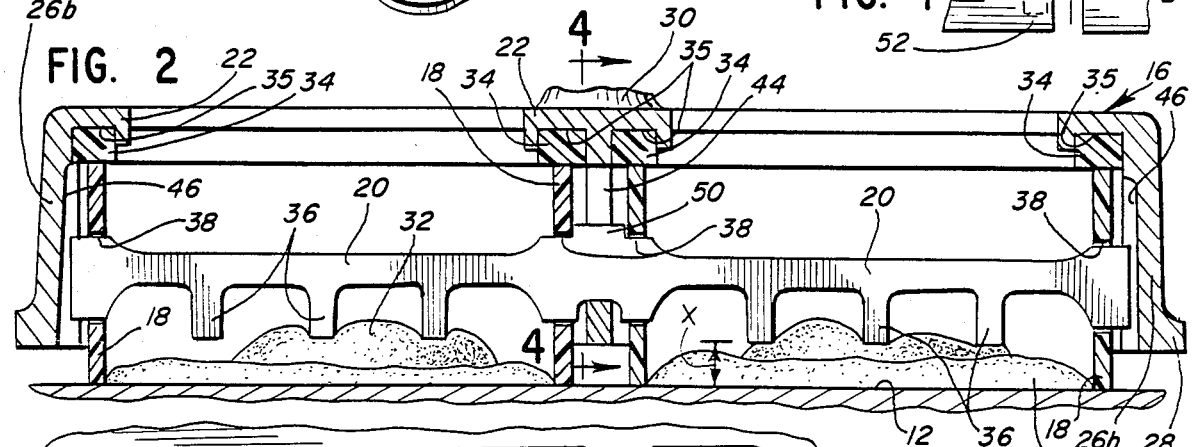
FIG. 2 is a vertical section, on an enlarged scale, taken generally along line 2—2 of FIG. 1.

Referring to the drawings in greater detail, and first to FIG. 1, an apparatus, generally designated 10, is disclosed to facilitate producing scrambled eggs on a heated grill surface 12 (see FIG. 2). The apparatus is extremely simple and includes three basic components, plus a handle or knob 14, the components being assembled without any extraneous parts. The components include a rectangular (or square) metal frame, generally designated 16; four egg rings 18; and two interceptor members 20. As will be described and understood hereinafter, these seven major parts (with handle 14 attached to frame 16, and cushions described hereinafter) are easily disassembled for cleaning and reassembled for use, without any other parts whatsoever.

More particularly, frame 16 is best shown in FIG. 1 and includes a top wall 22 having four cutouts 24 equally spaced about handle 14 and providing access, from above, to egg rings 18. The cutouts or openings are sufficiently large to easily deposit liquid eggs into the egg rings, but the dimensions of the openings are slightly smaller than the cross-dimensions of the egg rings so that the liquid eggs cannot be poured outside the confines of the egg rings. Frame 16 also has depending opposed side walls 26a and opposed side walls 26b. A generally horizontal peripheral flange 28 projects outwardly along the lower extremities of the side walls. A central boss 30 projects upwardly from top wall 22 of the frame for fixing handle 14 thereto.

Figure 3:
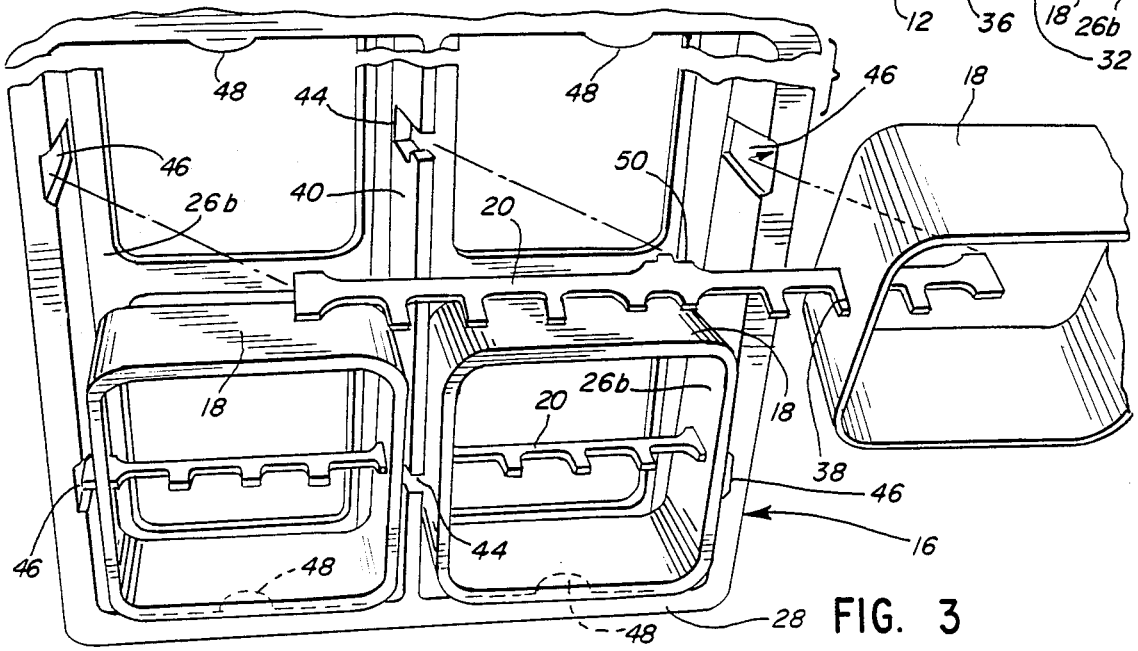
FIG. 3 is a fragmented, exploded, bottom perspective view of the apparatus.

Egg rings 18 are shown in FIG. 2 and best in the perspective view of FIG. 3. Each egg ring is formed simply of an upstanding, continuous square wall defining a confining region therewithin for receiving a portion of liquid eggs 32 (FIG. 2). The egg rings preferably are fabricated of rigid non-metallic material, such as plastic or the like. Sponge-like cushion strips 34 preferably are retained in grooves 35 in the underside of top wall 22 of frame 16 for abutting the top edges of the egg rings. The cushion strips are pressed into the grooves, held therein by their own compressive resiliency, and can be removed for cleaning. The cushion strips not only soften the movement of the apparatus over a grill surface, but the strips are effective to maintain the lower edges of the egg rings in intimate contact with the grill surface during use or simply under the weight of the apparatus.

Interceptor members 20 are shown best in FIGS. 2 and 3. Each interceptor member is formed as an elongated bar-like member of a comb configuration having a serrated lower edge defined by downwardly depending teeth 36. As will be described hereinafter, the teeth are positioned and are effective to engage or intercept the egg mix, as shown in FIG. 2, as the apparatus and egg rings move to and fro across grill surface 12. In essence, this "scrambles" the eggs as they are heated and expand.

One interceptor member or bar 20 is provided for two egg rings 18, as can be seen clearly in the drawings. The interceptor members are constructed in relation to the egg rings and the surrounding portions of frame 16 for readily removably mounting the interceptor members within the frame and, in turn, automatically mounting the egg rings in position within the frame as the function of mounting the interceptor members on the frame.

Figure 4:
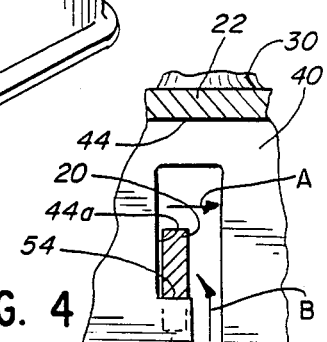
FIG. 4 is a fragmented, vertical section taken generally along line 4—4 of FIG. 3.

More particularly, each interceptor member extends through apertures 38 (FIG. 2) in opposite side walls of its respective two egg rings. When assembled, this positions the egg rings vertically with respect to frame 16 and maintains the upper edges of the egg rings in contact with cushion strips 34. As shown in FIGS. 2-4, an interior cross wall 40 is formed integrally with and depends downwardly from the underside of top wall 22 of frame 16. A pair of stepped notches 44 are formed in wall 40 generally centrally located with respect to each pair of egg rings supported by one of the interceptor members. In other words, this locates each interceptor member to span the center of its respective egg rings. In addition, a pair of angled or wedge-shaped recesses 46 are formed in the interior of frame side walls 26b for each notch 44 and the respective interceptor member. Each pair of recesses 46 is in line with the respective stepped notch 44 for each interceptor member. This alignment can be seen in FIGS. 2 and 3. Lastly, four inwardly projecting bosses 48 are formed integrally with the interior of frame side walls 26a, as shown in FIG. 3, for engaging the sides of the four egg rings.

In order to assemble and disassemble apparatus 10, namely to remove egg rings 18 and interceptor members or bars 20 from frame 16, it should be understood that the egg rings are fabricated of a resiliently stiff, heat resistant material, such as Teflon. Therefore, the egg rings are "springy". In assembly, two of the egg rings 18 are telescoped onto one of the interceptor bars 20 by telescoping or threading opposite ends of the interceptor member through apertures 38 in the egg rings, as shown by the right-hand egg ring in FIG. 3. The egg rings are moved toward the center of the interceptor member until they abut against shoulders defined by an upwardly projecting portion 50 (FIG. 2) in the middle of the interceptor member. The egg rings and interceptor member then can be positioned upwardly into the open bottom of frame 16. When doing so, wedge shaped recesses 46 engage opposite ends of the interceptor member to center the member. When properly positioned, the top edges of the egg rings abut against cushion strips 34, as described above.

In order to hold the egg rings and interceptor member in position within the frame, reference is made to FIG. 4 wherein it can be seen that stepped notch 44 in frame interior wall 40 has a step portion 52 defining an upwardly facing shoulder 54. This upwardly facing shoulder 54 is in direct or straight alignment with interceptor member 20 in assembled condition. However, during assembly, the interceptor member must bypass step 52 in order to reach that position. This is accomplished simply by slightly bending the springy egg rings so that the interceptor member can bypass step 52. Specifically, slight pressure is applied to the interceptor member toward the closest side of frame 16. The resilient egg rings flex against bosses 48 on the frame, allowing entry of the interceptor member into notch 44. The assembly is pushed into position and released, whereupon the resilient egg rings push and hold the interceptor member behind step 52 in notch 44. This maintains the interceptor member and its associated egg rings upwardly within the interior of frame 16. In essence, shoulder 54 forms a latch for the respective interceptor member.

In order to hold the interceptor member in position on top of shoulder 54, bosses 48 abut against the outside of the respective egg rings. Therefore, the egg rings and interceptor members cannot shift front-to-rear (as viewed in the drawings) by abutment of the egg rings with bosses 48 in one direction and the abutment of the interceptor members 20 with a side wall 44a (FIG. 4) of stepped notches 44. The assemblies cannot shift in the opposite direction, i.e. left-to-right as viewed in the drawings, by abutment of the egg rings in one direction with projecting portion 50 (FIG. 2) of the interceptor members and the inside of frame side walls 26b. To this end, it should be understood that some of the spacings shown in the drawings might indicate a more loose fit, but the spacings are shown necessarily to facilitate the illustration. In order to remove the egg rings and interceptor members from the underside of frame 16, the interceptor members simply are bent in the direction of arrow "A" (FIG. 4) and each interceptor member and its respective two egg rings are very easily lifted away from the frame.

Lastly, FIG. 2, which shows the apparatus in full assembly, shows that egg rings 18 project downwardly below the lower peripheral extremity of frame 16 for intimate contact with grill surface 12. In addition, a feature of the invention is to properly locate the distal ends of teeth 36 of the interceptor members a distance "X" above grill surface 12 approximately equal to the liquid depth of a quantity of two Grade A large eggs deposited in one of the egg rings. In other words, the distal ends of the teeth define the effective lower edge of the interceptor members. A precise dimension for this distance is not given herein because that would be determined by the area within the respective egg ring and easily can be calculated. For instance, it may be desired to have an apparatus with more than four egg rings but reducing the overall size of the apparatus. Therefore, the interior area of each egg ring would be smaller and, therefore, distance "X" would be larger. Such calculation easily can be made within the concepts of the invention, that distance being equal to a portion of two eggs and depending upon the interior area of the egg ring.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An apparatus to facilitate producing scrambled eggs on a heated grill surface, comprising:
    a frame;
    at least one egg ring having a lower edge portion adapted to be disposed in intimate contact with the grill surface for movement therealong and to define with the grill surface an enclosed region within the egg ring for confining liquid eggs;
    interceptor means extending across the egg ring in position to engage the liquid eggs therewithin in response to moving the apparatus to and fro over the grill surface;
    means for mounting the interceptor means on the frame; and
    complementary interengaging means between the interceptor means and the egg ring for carrying the egg ring on the interceptor means such that the egg ring is properly positioned relative to the frame as a function of mounting the interceptor means on the frame.

2. The apparatus of claim 1 wherein said complementary interengaging means include means for readily removably mounting the egg ring on the interceptor means.

3. The apparatus of claim 2 wherein said means for mounting the interceptor means on the frame include complementary interabutting means between the interceptor means and the frame for readily removably mounting the interceptor means on the frame.

4. The apparatus of claim 1 wherein said means for mounting the interceptor means on the frame include complementary interabutting means between the interceptor means and the frame for readily removably mounting the interceptor means on the frame.

5. The apparatus of claim 1, including at least two said egg rings and wherein the interceptor means comprises a single interceptor member spanning both egg rings.

6. The apparatus of claim 5 wherein said complementary interengaging means include means for readily removably mounting each egg ring on the single interceptor member.

7. The apparatus of claim 5 wherein said means for mounting the interceptor means on the frame include complementary abutting means between the interceptor member and the frame intermediate opposite ends of the interceptor member, between the two egg rings, for readily removably mounting the interceptor member and egg rings on the frame.

8. The apparatus of claim 7 wherein said means for mounting the interceptor member on the frame include second complementary abutting means between opposite ends of the interceptor member and the frame.

9. The apparatus of claim 8 wherein said second complementary abutting means include cam means for wedging the interceptor member into proper position on the frame.

10. The apparatus of claim 7 wherein said egg rings are resiliently stiff and said complementary abutting means include a latch portion on the frame whereby the egg rings can yield to snap an intermediate portion of the interceptor member behind the latch portion.

11. The apparatus of claim 1 wherein said egg ring is fabricated of non-metallic material.

12. The apparatus of claim 1 wherein said interceptor means has a serrated lower edge for engaging the liquid eggs.

13. The apparatus of claim 1, including manually graspable handle means on the frame to facilitate manual movement of the apparatus to and fro over the grill surface.

14. The apparatus of claim 1 wherein the interceptor means includes a lower edge spaced above the grill surface a distance calculated to equal approximately the liquid depth of a quantity of two Grade A large eggs deposited in the egg ring.

15. The apparatus of claim 1 including cushion means between the egg ring and the frame to bias the egg ring into intimate contact with the grill surface.

16. A manually operable apparatus to facilitate producing scrambled eggs on an appropriate independent heated grill surface, comprising:
    a frame independent of the grill surface and freely movably thereover;
    at least one egg ring having a lower edge portion adapted to be disposed in intimate contact with the grill surface for movement therealong and to define with the grill surface an enclosed region within the egg ring for confining liquid eggs;
    interceptor means extending across the egg ring in position to engage the liquid eggs therewithin in response to moving the apparatus to and fro over the grill surface; and
    manually graspable handle means on the frame to facilitate manual omnidirectional movement of the apparatus over the grill surface.

17. The manually operable apparatus of claim 16, including means for readily removably mounting said egg ring and said interceptor means on the frame without any extraneous components.

18. The manually operable apparatus of claim 16 wherein said egg ring is fabricated of non-metallic material.

19. The manually operable apparatus of claim 16 wherein said interceptor means has a serrated lower edge for engaging the liquid eggs.

20. The manually operable apparatus of claim 16 wherein the interceptor means includes a lower edge spaced above the grill surface a distance calculated to equal approximately the liquid depth of a quantity of two Grade A large eggs deposited in the egg ring.

21. The apparatus of claim 16 including cushion means between the egg ring and the frame to bias the egg ring into intimate contact with the grill surface.

* * * * *